United States Patent
Dezon-Gaillard et al.

(10) Patent No.: US 8,535,048 B2
(45) Date of Patent: Sep. 17, 2013

(54) HOT-RUNNER SYSTEM HAVING NON-STRUCTURALLY SUPPORTIVE HEAT INSULATOR INCLUDING VISIBLE MATERIAL

(75) Inventors: Patrice Fabien Dezon-Gaillard, Jericho, VT (US); Paul Blais, South Burlington, VT (US); Edward Joseph Jenko, Essex, VT (US)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 89 days.

(21) Appl. No.: 13/318,923

(22) PCT Filed: May 11, 2010

(86) PCT No.: PCT/US2010/034283
§ 371 (c)(1),
(2), (4) Date: Nov. 4, 2011

(87) PCT Pub. No.: WO2010/132381
PCT Pub. Date: Nov. 18, 2010

(65) Prior Publication Data
US 2012/0055662 A1    Mar. 8, 2012

Related U.S. Application Data

(60) Provisional application No. 61/177,667, filed on May 13, 2009.

(51) Int. Cl.
*B29C 45/74* (2006.01)
(52) U.S. Cl.
USPC ............... 425/547; 264/328.15; 425/549
(58) Field of Classification Search
USPC ................. 425/549, 547; 264/328.15
See application file for complete search history.

(56) References Cited

U.S. PATENT DOCUMENTS 2,878,515 A   3/1959   Strauss
3,231,656 A   1/1966   Ninneman
(Continued)

FOREIGN PATENT DOCUMENTS

DE   29610028 U1   9/1996
DE   19528648 A1   2/1997
(Continued)

OTHER PUBLICATIONS

Environmental Energy Technologies Division et al.: "SilicaAerogels"; Internet Citation, Jan. 1, 2007, pp. 1-3. Retrieved from the Internet: URL: http://eetd.lbl.gov/ECS/Aerogels/sa-thermal.htm.
Examples of known molding systems, www.husky.ca.

*Primary Examiner* — Tim Heitbrink

(57) ABSTRACT

Hot-runner system (100) for use with molding system. Hot-runner system (100) having: heater (102) to generate heat responsive to receiving power. Heat-sourcing component (104) to receive heat from the heater (102) so that the heat that is generated by the heater (102) is transferred, at least in part, from heater (102) to heat-sourcing component (104). Heat-sourcing component (104) becomes heated to an operating temperature. Heat-receiving component (106) being at least partially spaced from the heat-sourcing component (104). The operating temperature of the heat-receiving component (106) being cooler than operating temperature of the heat-sourcing component (104). Non-structurally supportive heat insulator (108) has thermal conductivity being lower than thermal conductivity of air during operation of the hot-runner system (100). Whereby, in use, non-structurally supportive heat insulator (108): (i) reduces heat transmission from heat-sourcing component (104) to heat-receiving component (106), and (ii) permits reduction of power consumption of heater (102).

5 Claims, 4 Drawing Sheets

(56) References Cited

U.S. PATENT DOCUMENTS

| | | |
|---|---|---|
| 3,741,704 A | 6/1973 | Beasley et al. |
| 4,151,243 A | 4/1979 | Allen |
| 5,125,827 A * | 6/1992 | Gellert ............... 425/549 |
| 5,148,594 A * | 9/1992 | Gellert ............... 425/549 |
| 5,569,475 A | 10/1996 | Adas et al. |
| 6,062,840 A | 5/2000 | Lee et al. |
| 2004/0234644 A1 | 11/2004 | Peng |
| 2005/0045746 A1 | 3/2005 | Blais |
| 2008/0069918 A1 | 3/2008 | Ramond |

FOREIGN PATENT DOCUMENTS

| | | |
|---|---|---|
| WO | 2007095515 A2 | 8/2007 |
| WO | 2008155650 A2 | 12/2008 |

* cited by examiner

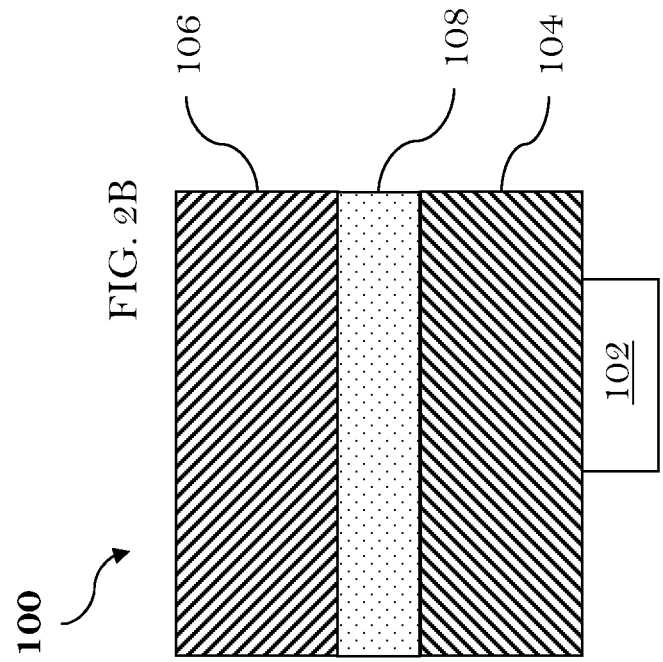
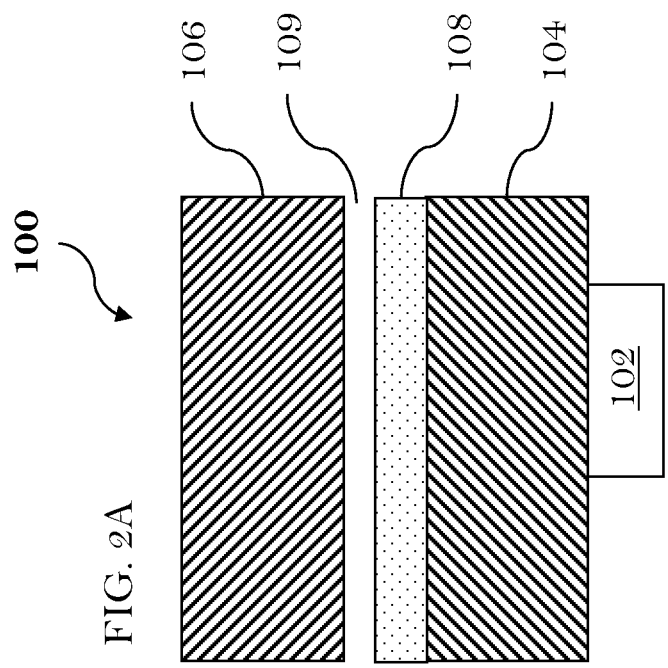

HOT-RUNNER SYSTEM HAVING NON-STRUCTURALLY SUPPORTIVE HEAT INSULATOR INCLUDING VISIBLE MATERIAL

TECHNICAL FIELD

The present invention generally relates to, but is not limited to, hot-runner systems for use with molding systems, and more specifically the present invention relates to, but is not limited to a hot-runner system configured for use with a molding system, the hot-runner system has an insulator that includes a visible material, and the visible material has a thermal conductivity being lower than the thermal conductivity of air.

BACKGROUND OF THE INVENTION

Examples of known molding systems are (amongst others): (i) the HYPET (TRADEMARK) Molding System, (ii) the QUADLOC (TRADEMARK) Molding System, (iii) the HYLECTRIC (TRADEMARK) Molding System, and (iv) the HYMET (TRADEMARK) Molding System, all manufactured by HUSKY INJECTION MOLDING SYSTEMS LIMITED (location: Ontario, Canada).

Known insulating materials (also called "heat insulators") are placed or located between components of known hot-runner systems, such as: a hot-runner manifold and a cooled mold plate. The following are examples of known heat insulators that are used in known hot-runner systems: asbestos, mica, ceramic, mineral wool, calcium silicate, and/or magnesium silicate, each example having a thermal conductivity that is greater than (sometimes as much as ten times more than) the thermal conductivity of air. It will be appreciated that these types of known heat insulators are relatively inefficient in comparison to using an air gap between the known components. The air gap is also a known heat insulator, but unfortunately the air gap permits the following drawbacks: (i) heat convection between the known components, and (ii) heat radiation transmitted between the known components when the known components are operated at respectively different temperatures. The following references provide examples of known heat insulators used in known hot-runner systems.

U.S. Pat. No. 2,878,515 (Inventor: STRAUSS; Published: 24 Mar. 1959) discloses an injection molding apparatus in which a molding material is injected into a heated chamber from which the molding material is passed to a cooled die cavity. The die cavity is insulated from the heated chamber by a heat insulator.

U.S. Pat. No. 3,231,656 (Inventor: NINNEMAN; Published: 25 Jan. 1966) discloses a molding apparatus having a section that includes a main feed block being heated by conduits separated from a platen by heat-insulating pads. The heat-insulating pads include TRANSITE™, which is a heat insulating material manufactured by JOHNS-MANVILLE COMPANY (location: United States of America).

U.S. Pat. No. 3,741,704 (Inventor: BEASLEY; Published: 26 Jun. 1973) discloses a hot-runner injection molding apparatus, which includes a plunger for injecting a molding material from a nozzle portion into a mold cavity of a mold that defines the shape of the article to be molded. A thermal insulator is used for insulating the nozzle portion from the mold.

U.S. Pat. No. 5,569,475 (Inventor: ADAS et al.; Published: 29 Oct. 1996) discloses a thermal-plastic molding device, which includes a thermal insulator provided between a nozzle assembly and surrounding plates. The thermal insulator includes a ceramic material such as zirconia oxide, which is sprayed to form a coating. Alternatively the thermal insulator can be provided as a ring around the nozzle assembly.

United States Patent Application Number 2004/0234644 (Inventor: PENG; Published: 25 Nov. 2004) discloses a molding machine, which includes: (i) an upper board connected to a material injection device, and (ii) a runner base connected to an underside of the upper board. The runner base includes a heat-isolating board and a scrap-removal board connected to the heat-isolating board. A plurality of runners is defined through the heat-isolating board.

United States Patent Application Number 2008/0069918 (Inventor: RAMOND; Published: 20 Mar. 2008) discloses, all around the peripheral edge of a distributor used in a molding system, a continuous peripheral space, which defines an air gap that contributes to the thermal insulation of the distributor. Thermal insulation is improved by filling the space with a thermal-insulating material.

SUMMARY OF THE INVENTION

The inventors believe that the problem associated with known hot-runner systems is not understood by persons skilled in the art of molding system and hot-runner systems; due to the high cost of energy associated with operating hot-runner systems, the inventors believe known heat insulators must be improved, and in this manner energy conservation is improved; more specifically, the inventors believe that what is required is a heat insulator that works better than the heat-insulating ability of air, and this new arrangement will mitigate, at least in part, the drawbacks associated with operating costs associated with the known hot-runner systems.

According to a first aspect of the present invention, there is provided a hot-runner system being configured for use with a molding system the hot-runner system including: a heater being configured to generate thermal energy responsive to receiving power; a heat-sourcing component being configured to receive the thermal energy from the heater so that the thermal energy that is generated by the heater is transferred, at least in part, from the heater to the heat-sourcing component, and the heat-sourcing component becomes heated to an operating temperature; a heat-receiving component being at least partially spaced from the heat-sourcing component, the operating temperature of the heat-receiving component being cooler than the operating temperature of the heat-sourcing component; and a non-structurally supportive heat insulator having a thermal conductivity being lower than the thermal conductivity of air during operation of the hot-runner system, whereby, in use, the non-structurally supportive heat insulator: (i) reduces heat transmission from the heat-sourcing component to the heat-receiving component, and (ii) permits reduction of power consumption of the heater.

According to a second aspect of the present invention, there is provided a hot-runner system configured for use with a molding system. The hot-runner system includes a heater configured to generate thermal energy responsive to receiving power. The hot-runner system also includes a heat-sourcing component configured to receive the thermal energy from the heater, so that the thermal energy that is generated by the heater is transferred, at least in part, from the heater to the heat-sourcing component, and the heat-sourcing component becomes heated to an operating temperature. The hot-runner system also includes a heat-receiving component that is at least partially spaced from the heat-sourcing component. The operating temperature of the heat-receiving component is cooler than the operating temperature of the heat-sourcing component. The hot-runner system also includes a non-structurally supportive heat insulator including a visible material. The visible material is temperature compatible with the heat-sourcing component. The visible material has a thermal conductivity that is lower than the thermal conductivity of air during operation of the hot-runner system, whereby, in use, the non-structurally supportive heat insulator: (i) reduces heat transmission from the heat-sourcing component to the heat-receiving component, and (ii) permits reduction of power consumption of the heater.

A technical effect, amongst other technical effects, of the aspects of the present invention is a reduction in heat loss (due to: heat conduction and/or heat convection and/or heat radiation) from the hot-runner system, which means less energy is required to heat the components of the hot-runner system. By reducing the heat losses, the following advantages may be realized: (i) power consumption (and thus operating costs) and are lowered, and (ii) heat up of selected hot-runner components becomes faster (thus reducing start up time and improving operational efficiencies). The inventors have determined the following: (i) power consumed by the heater is reduced from approximately 10% to approximately 30% (more or less) in comparison to known hot-runner systems (depending on the structure of the hot-runner systems), and (ii) financial payback (taking into account the capital cost of the non-structurally supportive heat insulator) is approximately less than one year (in some instances less than three months) of operation of the hot-runner system (depending on how often the hot-runner system is operated).

BRIEF DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which:

FIGS. 2A and 2B depict a schematic representation, at least in part, of the HR system 100 according to a first variant and a second variant, respectively, of the HR system 100 of FIG. 1;

Figure 1:
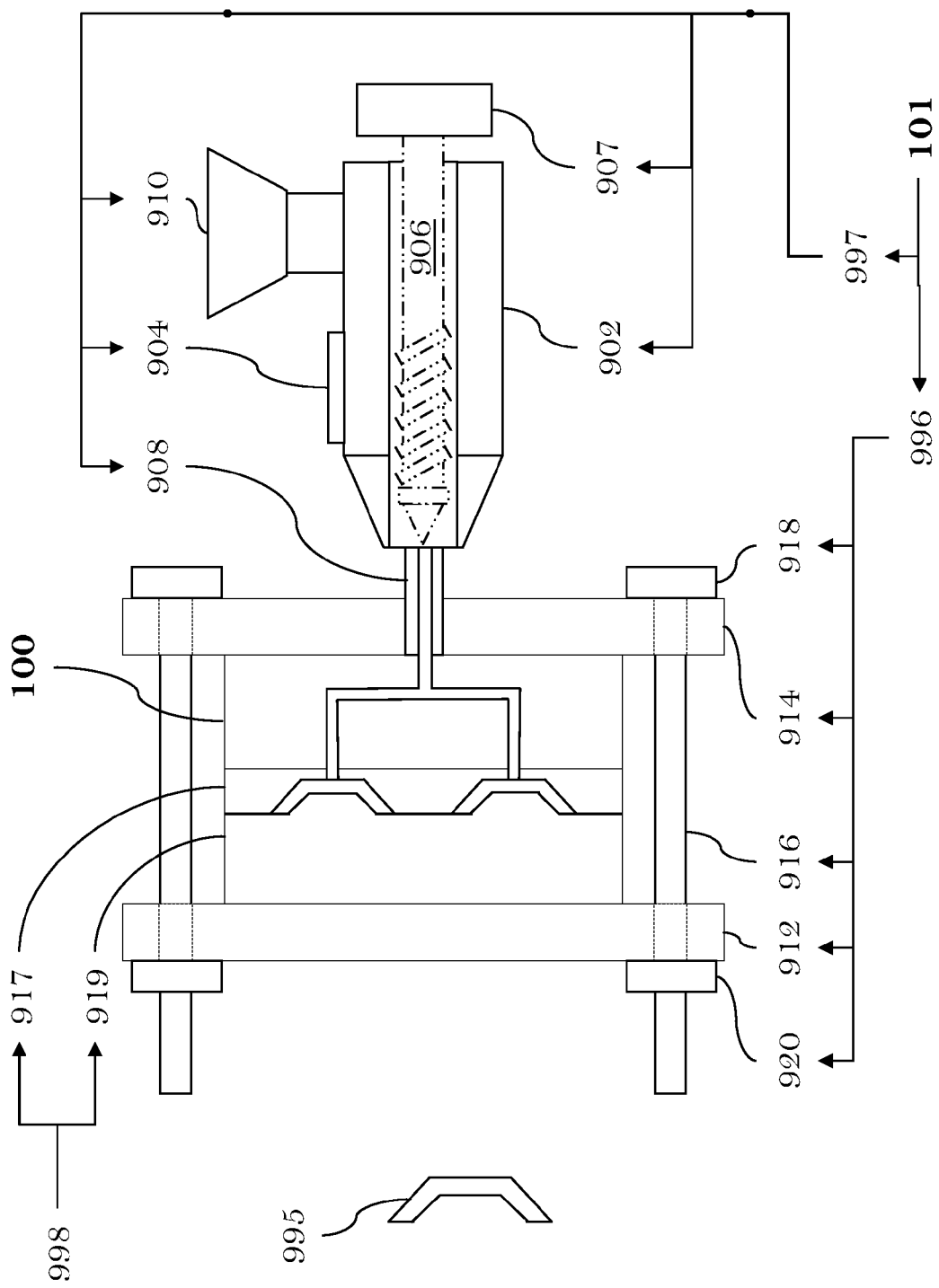
FIG. 1 depicts a schematic view, at least in part, of a hot-runner system 100 (hereafter referred to as the "HR system 100") and a molding system 101 according to a first non-limiting embodiment.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

REFERENCE NUMERALS USED IN THE DRAWINGS

The following is a listing of the elements designated to each reference numeral used in the drawings:
hot-runner system 100
molding system 101
heater 102
nozzle heater 103
heat-sourcing component 104
manifold heater 105
heat-receiving component 106
non-structurally supportive heat insulator 108
air gap 109
heatable manifold 140
plate pocket 142
plate structure 144
housing 160
nozzle bore 162
flowable solid 170
barrel 902
barrel heater 904
screw 906
screw actuator 907
machine nozzle 908
hopper 910
movable platen 912
stationary platen 914
rods 916
stationary mold portion 917
clamp units 918
movable mold portion 919
lock nuts 920
molded article 995
clamp assembly 996
extruder 997
mold assembly 998

DETAILED DESCRIPTION OF THE PREFERRED EMBODIMENT(S)

FIG. 1 depicts the schematic view, at least in part, of the HR system 100 and the molding system 101 according to the first non-limiting embodiment. The HR system 100 is configured for use with the molding system 101 (such as, an injection-molding system, etc). It will be appreciated that the HR system 100 and the molding system 101 may include components (and sub-systems) that are known to persons skilled in the art, and as such these known components will not be described in this document. A description of the known components and known sub-systems is provided, at least in part, with sufficient details in the following reference books: (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" (Third Edition) authored by JOHANNABER (ISBN 3-446-17733-7) and/or (iv) "*Runner and Gating Design Handbook*" authored by BEAUMONT (ISBN 1-446-22672-9). The molding system 101 includes (but is not limited to) the following known components: (i) a clamp assembly 996, and (ii) an extruder 997. The clamp assembly 996 includes a combination of: a stationary platen 914, a movable platen 912, clamp units 918, rods 916, and lock nuts 920. The extruder 997 includes a combination of a barrel 902, a screw 906, a screw actuator 907, a barrel heater 904, a machine nozzle 908, and a hopper 910. The clamp assembly 996 of the molding system 101 is configured to accommodate or receive a mold assembly 998 having combination of a movable mold portion 919 and a stationary mold portion 917. Usually, but not always, the mold assembly 998 and the HR system 100 are sold separately from the molding system 101. The HR system 100 is mounted to the stationary platen 914, and the stationary mold portion 917 is mounted to the HR system 100. The machine nozzle 908 is connected with the HR system 100. In operation, a molding material is injected, under pressure, from the extruder 997, through the machine nozzle 908, through the HR system 100, and into the mold cavities defined by the mold assembly 998, so that a molded article 995 may be formed in at least one of the mold cavities.

FIG. 2A depicts, at least in part, the schematic representation of the HR system 100 according to the first variant of the HR system 100 of FIG. 1. The HR system 100 includes (but is not limited to): (i) a heater 102; (ii) a heat-sourcing component 104; (iii) a heat-receiving component 106, and (iv) a non-structurally supportive heat insulator 108 (hereafter referred to as the "insulator 108"). The term "non-structurally supportive" means that the insulator 108 provides an insignificant amount of structural integrity and/or structural support (if any support) for the components used in the HR system 100. The heater 102 is configured to generate thermal energy responsive to receiving power (that is, once the heater 102 is energized with electrical power). It is understood that thermal energy is energy derived from heat. An example of a supplier of the heater 102 for use in the HR system 100 is HUSKY INJECTION MOLDING SYSTEMS LIMITED (location: Ontario, Canada). The heat-sourcing component 104 is configured to receive the thermal energy from the heater 102 because the heat-sourcing component 104 is coupled with the heater 102. In this arrangement, the thermal energy generated by the heater 102 is transferred, at least in part, from the heater 102 to the heat-sourcing component 104. In this arrangement, the heat-sourcing component 104 becomes heated to an operating temperature. The operating temperature is a temperature that is required by components of the HR system 100 for processing and/or conveying a molding material. The heat-sourcing component 104 is a source of thermal energy, which was received from the heater 102. It will be appreciated that the heater 102 may be integral with the heat-sourcing component 104 or may be separate from the heat-sourcing component 104. Examples of the heat-sourcing component 104 are provided in the description associated with FIG. 3. The heat-receiving component 106 is at least partially spaced from the heat-sourcing component 104. Examples of the heat-receiving component 106 are provided in the description associated with FIG. 3. The operating temperature of the heat-receiving component 106 is cooler than the operating temperature of the heat-sourcing component 104. The insulator 108 includes a visible material. The visible material is a material that emits light waves with wavelengths that are visible to, or perceptible by, the human eye. The visible material is temperature compatible with the heat-sourcing component 104 (that is, the visible material does not combust when the heat-sourcing component 104 becomes heated to its operating temperature). The visible material has a thermal conductivity that is lower than the thermal conductivity of air during operation of the hot-runner system 100. Thermal conductivity is a Thermal conductivity is a property of a material that indicates its ability to conduct heat. In use, the insulator 108: (i) reduces heat transmission from the heat-sourcing component 104 to the heat-receiving component 106, and (ii) permits reduction of power consumption of the heater 102, in comparison to the performance of air as a heat-insulation material (and/or known heat insulators used in known hot-runner systems).

FIG. 2A depicts, at least in part, the schematic representation of the HR system 100 according to the first variant of the HR system 100 of FIG. 1, in which the insulator 108 abuts the heat-sourcing component 104, and an air gap 109 exists between the insulator 108 and the heat-receiving component 106. The advantage of using the arrangement depicted in FIG. 2A is that heat conduction is reduced, heat convection is reduced, and heat radiation is reduced. The insulator 108 permits: (i) less energy usage even though the insulator 108 has a capital cost, and (ii) faster start up for the HR system 100 (that is, the HR system 100 reaches operating temperatures faster than known hot-runner systems).

FIG. 2B depicts, at least in part, the schematic representation of the HR system 100 according to the second variant of the HR system 100 of FIG. 1, in which the insulator 108 abuts the heat-sourcing component 104 and the heat-receiving component 106, and there is no air gap that exists between: (i) the insulator 108 and the heat-sourcing component 104, and (ii) the insulator 108 and the heat-receiving component 106. The advantage with the arrangement depicted in FIG. 2B is that heat conduction is reduced, heat convection is eliminated (or very sharply reduced), and heat radiation is eliminated (or very sharply reduced). In accordance with a third variant (not depicted) the HR system 100 of FIG. 1, the insulator 108 does not abut the heat-sourcing component 104 and the heat-receiving component 106, so that an air gap exists between: (i) the insulator 108 and the heat-sourcing component 104, and (ii) the insulator 108 and the heat-receiving component 106. In accordance with a fourth variant (not depicted) of the HR system 100 of FIG. 1, the insulator 108 abuts the heat-receiving component 106, and an air gap exists between the insulator 108 and the heat-sourcing component 104.

In accordance with a first example of the insulator 108, the insulator 108 includes an aerogel material, which is also called "aerogels". An example of a manufacturer of the aerogel material is ASPEN AEROGELS INCORPORATED (location: Massachusetts, United States of America). Generally, the aerogel material has a monolithic structure and has a pore structure or air pockets formed in the monolithic structure. A monolithic structure is an integral structure. The aerogel material may be included in a media that is used to carry or support the aerogel material. Heat conduction path through the aerogel material is not straight but takes a serpentine or tortuous path (that is, a non-linear heat path for conducting heat) through the aerogel material, which forces heat to travel further through the aerogel material. The aerogel material has a thermal conductivity that is lower than the thermal conductivity of air. The aerogel material is visible. The aerogel material, for example, may form or include an aerogel blanket and/or a carrier including the aerogel material. A non-limiting example of the aerogel material includes an aerogel material having a silicon-based solid including a porous, sponge-like structure of which approximately 99.8 percent of the volume is empty space. Since the aerogel material is approximately 99.8% air, the aerogel material appears semi-transparent to the human eye. The color of aerogel is due to Rayleigh scattering of the shorter wavelengths of visible light by the nano-sized dendritic structure of aerogel, and this arrangement causes some aerogel materials to appear smoky blue against dark backgrounds and yellowish against bright backgrounds. Aerogels have relatively low thermal conductivity from approximately 0.03 W/m·K (where, W=Watts, m=meter and K=degrees Kelvin) down to approximately 0.004 W/m·K, which correspond to R-values of from approximately 14 to 105 for approximately 3.5 inch thickness of the aerogel material; for comparison, known wall insulation is about 13 for 3.5 inch thickness of the wall insulation. The aerogel material is approximately 1,000 times less dense than glass, which is another silicon-based solid. To the touch, aerogels feel like a light, rigid foam something between STYROFOAM™ and the green-floral foam used for arranging flowers. The aerogel material is a dry material and does not physically resemble a gel; the name "aerogel" comes from the fact that the aerogel material is derived from a gel. Pressing softly on the aerogel material typically does not leave a mark; pressing more firmly may leave a permanent dimple. Pressing firmly enough will cause a catastrophic breakdown in the sparse structure of the aerogel material, causing it to shatter like glass-a property known as friability. Despite the fact that the aerogel material is prone to shattering, it is structurally sound. The aerogel material has a dendritic microstructure, in which spherical particles of average size of approximately two to five nm (nanometers) are fused together into clusters. These clusters form a three-dimensional highly-porous structure of almost fractal chains with pores smaller than approximately one hundred nm. The average size and density of the pores can be controlled during manufacturing of the aerogel material. The aerogel material almost nullifies the three methods of heat transfer, which are convection, conduction and radiation. The aerogel material inhibits or reduces heat convection because air cannot circulate throughout the lattice structure of the aerogel material. Silica aerogel is a good heat insulator because silica is a poor conductor of heat. A metallic aerogel, on the other hand, may be a relatively less effective heat insulator compared with silica aerogel. Other types of aerogels are, for example: (i) carbon aerogels, (ii) alumina aerogels, (iii) nickel-alumina aerogel, (iv) organic aerogel made of agar, (v) chalcogels, which are a type of aerogel made of chalcogens (that is, the column of elements on the periodic table beginning with oxygen) such as sulfur, selenium, and other elements, and/or (vi) aerogels made of cadmium selenide.

In accordance with a second example of the insulator 108, the insulator 108 includes a microporous material. Generally, the microporous material has a monolithic structure and has a pore structure or air pockets formed in the monolithic structure. Examples manufacturers of the microporous material are MICROTHERM INCORPORATED (location: Tennessee, United States of America), and ZIRCAR CERAMICS INCORPORATED (location: New York, United States of America). It will be appreciated that the visible material associated with the microporous material includes a nanomaterial having micropores. A nanomaterial is a material displaying specific properties due to the nanometric dimensions of its structure. A nanomaterial is a material made up of nanostructures between one and one hundred nm in size. These nanostructures can be nanoparticles, nanotubes (such as carbon nanotubes) or nanocrystals. The microporous material is a heat insulator that provides resistance to heat transfer for high-temperature apparatus, such as the HR system 100. The microporous material minimizes heat conduction in the following three ways: (A) approximately 90% of the volume in the microporous material is void space where only less efficient gaseous conduction can take place, (B) the nano-sized particles making up the microporous material have restricted contact with one another, which limits thermal pathways (the amount of heat conducted is directly proportional to the cross-sections of the conduction path), and (C) heat paths through the solid matrix of the microporous material are very tortuous and therefore long, and this arrangement decreases the rate at which heat can flow by solid conduction (amount of heat conducted is inversely proportional to the length of the conduction path). Gaseous conduction is restricted by the microporous effect associated with the microporous material. The microporous effect is the restriction of collisions between air molecules which leads to heat transfer, and this arrangement is ensured by voids in the material being smaller than the mean-free path of the air molecules (approximately one hundred nm at atmospheric pressure). Under these circumstances most of the collisions an air molecule experiences are with the walls of the microporous material, a process which transfers little energy. The thermal conductivity of the microporous material is lower than the thermal conductivity of air.

Figure 3:
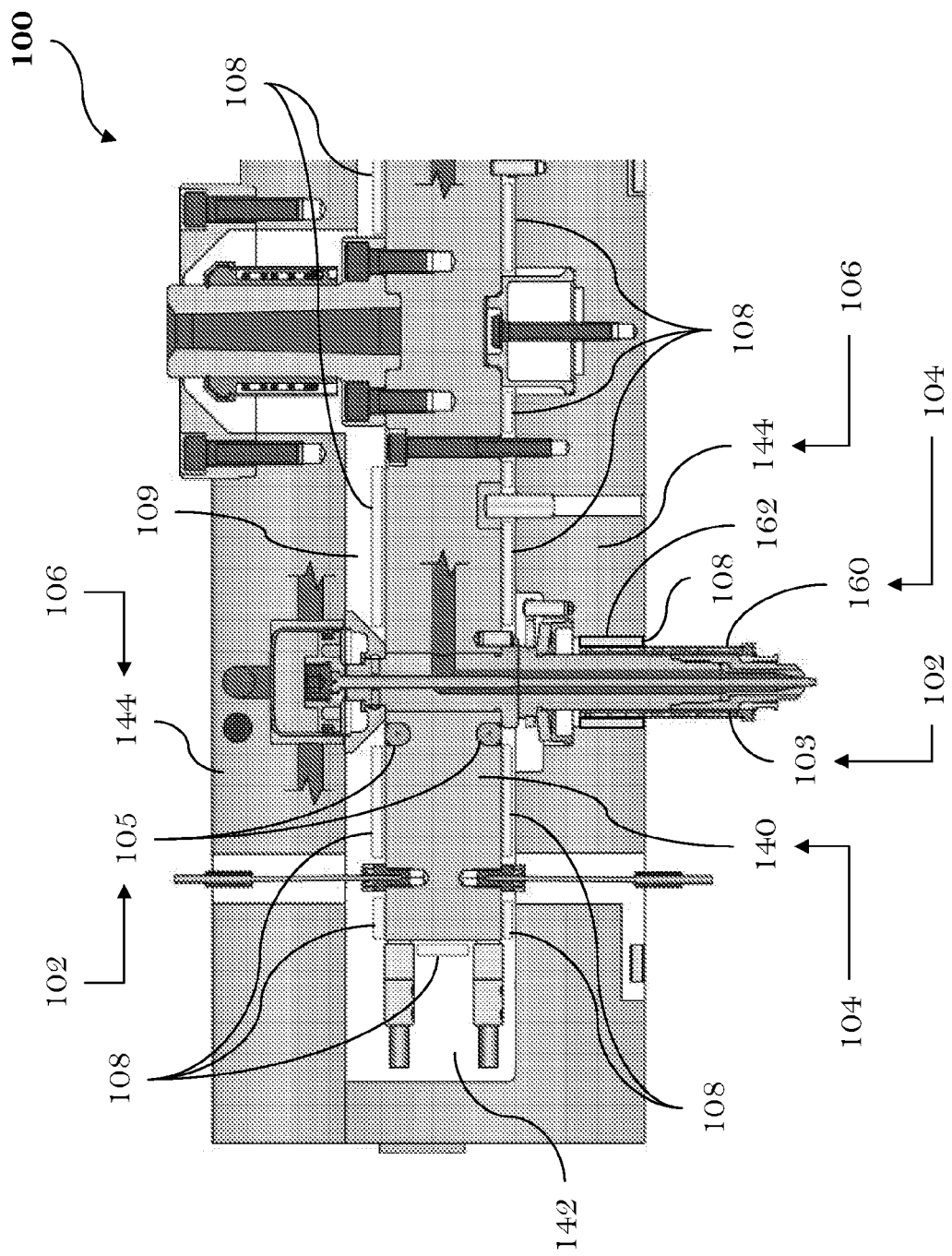
FIG. 3 depicts a schematic representation, at least in part, of the HR system 100 according to a second embodiment of the HR system 100 of FIG. 1.

FIG. 3 depicts, at least in part, the schematic representation of the HR system 100 according to the second non-limiting embodiment of the HR system 100 of FIG. 1, in which the visible material (of the insulator 108) is configured to form a blanket, which may also be called a panel, and which may be rigid or flexible in structure. According to a first example of the second non-limiting embodiment: (i) the heater 102 includes a manifold heater 105, (ii) the heat-sourcing component 104 104 includes a heatable manifold 140 that is coupled or connected with the manifold heater 105, (iii) the heat-receiving component 106 includes a plate pocket 142 defined, at least in part, by a plate structure 144, and (iv) the insulator 108 is located or received, at least in part, in the plate pocket 142 between the heatable manifold 140 and the plate structure 144. According to second example the second non-limiting embodiment: (i) the heater 102 includes a nozzle heater 103, (ii) the heat-sourcing component 104 includes a housing 160 of the nozzle heater 103, (iii) the heat-receiving component 106 includes a plate structure 144 defining a nozzle bore 162, and (iv) the non-structurally supportive heat insulator 108 is located, at least in part, in the nozzle bore 162 between the housing 160 of the nozzle heater 103 and the plate structure 144.

Figure 4:
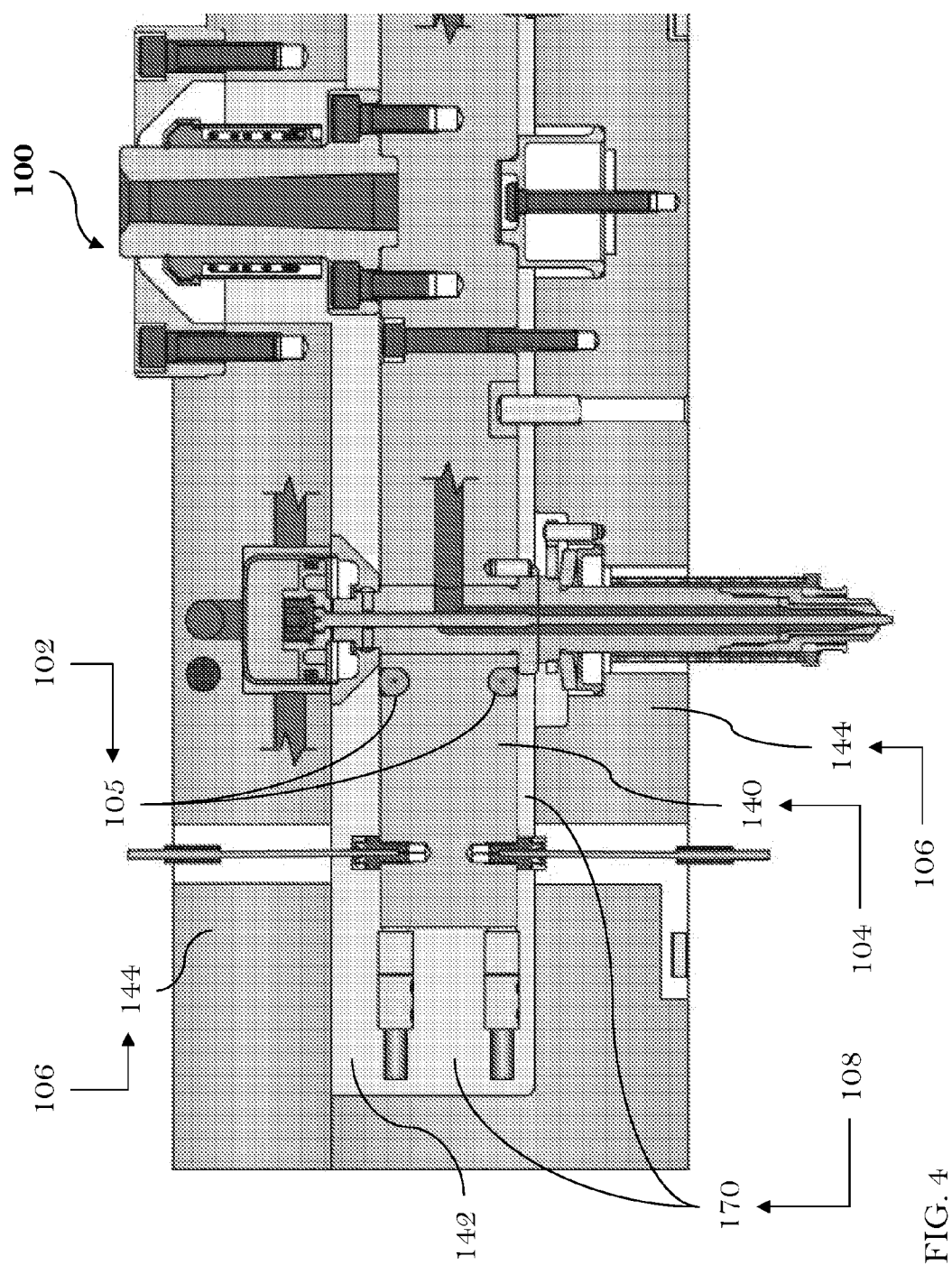
FIG. 4 depicts a schematic representation, at least in part, of the HR system 100 according to a third embodiment of the HR system 100 of FIG. 1.

FIG. 4 depicts, at least in part, the schematic representation of the HR system 100 according to the third embodiment of the HR system 100 of FIG. 1, in which the visible material of the insulator 108 includes a flowable solid 170 filled, at least in part, between the components of the HR system 100. The flowable solid 170 may include a flowable powder and/or flowable granules. FIG. 4 depicts the flowable solid 170 received in the plate pocket 142 defined, at least in part, by the plate structure 144, and received, at least in part, in the plate pocket 142 between the heatable manifold 140 and the plate structure 144. It will be appreciated that other variations of the placement of the insulator 108 are possible.

The description of the non-limiting embodiments provides non-limiting examples of the present invention; these non-limiting examples do not limit the scope of the claims of the present invention. The non-limiting embodiments described are within the scope of the claims of the present invention. The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is protected by way of letters patent are limited only by the scope of the following claims:

What is claimed is:
1. A hot-runner system, comprising:
a heater configured to generate thermal energy responsive to receiving power;

a heat-sourcing component configured to receive the thermal energy from the heater so that the thermal energy that is generated by the heater is transferred, at least in part, from the heater to the heat-sourcing component, and the heat-sourcing component becomes heated to an operating temperature;

a heat-receiving component at least partially spaced from the heat-sourcing component, the operating temperature of the heat-receiving component being cooler than the operating temperature of the heat-sourcing component; and a non-structurally supportive heat insulator including a visible material that includes a microporous material including a nanomaterial having micropores, the visible material being temperature compatible with the heat-sourcing component, and the visible material having a thermal conductivity being lower than the thermal conductivity of air during operation of the hot-runner system, whereby, in use, the non-structurally supportive heat insulator: (i) reduces heat transmission from the heat-sourcing component to the heat-receiving component, and (ii) permits reduction of power consumption of the heater.

2. The hot-runner system of claim 1, wherein:
the heater includes a manifold heater;
the heat-sourcing component includes a heatable manifold coupled with the manifold heater;
the heat-receiving component includes a plate pocket defined by a plate structure; and
the non-structurally supportive heat insulator is located, at least in part, in the plate pocket between the heatable manifold and the plate structure.

3. The hot-runner system of claim 1, wherein:
the heater includes a nozzle heater;
the heat-sourcing component includes a housing of the nozzle heater;
the heat-receiving component includes a plate structure defining a nozzle bore; and
the non-structurally supportive heat insulator is located, at least in part, in the nozzle bore between the housing of the nozzle heater and the plate structure.

4. The hot-runner system of claim 1, wherein the non-structurally supportive heat insulator is configured to form a blanket.

5. A molding system, comprising the hot-runner system of any one of claims 1-3 or 4.

* * * * *